United States Patent
Naeimi et al.

(10) Patent No.: US 8,134,341 B2
(45) Date of Patent: Mar. 13, 2012

(54) ENERGY HARVESTING BASED ON USER-INTERFACE OF MOBILE COMPUTING DEVICE

(75) Inventors: Helia Naeimi, Santa Clara, CA (US); Qing Ma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 12/435,378

(22) Filed: May 4, 2009

(65) Prior Publication Data
US 2010/0277126 A1    Nov. 4, 2010

(51) Int. Cl.
*H02J 7/00*    (2006.01)
(52) U.S. Cl. ......................... 320/137; 320/128
(58) Field of Classification Search .................... 320/137
See application file for complete search history.

(56) References Cited

U.S. PATENT DOCUMENTS

| | | | |
|---|---|---|---|
| 6,943,476 B2 * | 9/2005 | Regazzi et al. | 310/156.47 |
| 7,775,110 B2 * | 8/2010 | Okuda et al. | 73/627 |
| 7,960,851 B2 * | 6/2011 | Van Huffel | 290/54 |
| 2007/0257634 A1 * | 11/2007 | Leschin et al. | 320/107 |
| 2009/0241666 A1 * | 10/2009 | Gerfers et al. | 73/514.32 |
| 2010/0102673 A1 * | 4/2010 | Leukkunen | 310/318 |

FOREIGN PATENT DOCUMENTS

| | | |
|---|---|---|
| JP | 7-075265 | 3/1995 |
| KR | 2001-0063517 | 7/2001 |

OTHER PUBLICATIONS

Notice of Preliminary Rejection for Korean Patent Application No. 10-2010-41268, Mailed May 27, 2011, 11 pages.

* cited by examiner

*Primary Examiner* — Huy Q Phan
*Assistant Examiner* — Alesa Allgood
(74) *Attorney, Agent, or Firm* — Blakely, Sokoloff, Taylor & Zafman LLP

(57) ABSTRACT

Embodiments of the invention relate to a mobile computing device with ambient energy harvesting capability. Embodiments of the invention, when manually operated by a user, convert the kinetic motion of a part of the user's hand, applied onto a controller of the device, to electrical energy. The energy can be used to power the device, or to charge the battery of the device. Embodiments of the invention include an electrical power storage device disposed in a housing, a display screen attached to the housing to display a plurality of user-interactive interfaces, and a manually operable input controller interactable with the interfaces and being coupled to an energy transformer in the housing to electrically charge the power storage device when operated.

19 Claims, 4 Drawing Sheets

ENERGY HARVESTING BASED ON USER-INTERFACE OF MOBILE COMPUTING DEVICE

FIELD

Embodiments of the invention relate to the field of mobile electronic device. More particularly, embodiments of the invention relate to a mobile electronic device capable of generating electric power when manually operated.

BACKGROUND

Modern mobile computing devices include wide range of capabilities such as e-mailing, surfing the Internet, downloading and playback of multimedia content, and gaming. Such applications typically require more advanced logic devices. Accordingly, such applications typically result in more power consumption and require more memory.

Many efforts of research and development are dedicated to increasing the life and performance of rechargeable battery for mobile computing devices. However, few efforts have been dedicated to harvest the ambient energy and channel the harvested energy to charge the battery of a mobile computing device. There are known tools in the market that provide recharging of batteries for mobile electronic devices. For example, there are devices that are capable of recharging the battery of electronic devices by converting the solar energy to electrical energy. There are also devices that require a user to repetitively activate a yoyo-like mechanism to generate and store electrical energy for charging an electronic device. Said devices are typically not convenient to carry with a mobile computing device. The use of these charging devices may be limited. For example, sufficient intensity of solar energy may not always be available.

BRIEF DESCRIPTION OF THE DRAWINGS

Embodiments of the invention are illustrated by way of example and not limitation in the figures of the accompanying drawings, in which like references indicate similar elements.

DETAILED DESCRIPTION

Embodiments of the invention relate to a mobile computing device with ambient energy harvesting capability. Embodiments of the invention, when manually operated by a user, convert the kinetic motion of a part of the user's hand, applied onto a controller of the device, to electrical energy. The energy can be used to power the device, or to charge the battery of the device. Embodiments of the invention include an electrical power storage device disposed in a housing, a display screen attached to the housing to display a plurality of user-interactive interfaces, and a manually operable input controller interactable with the interfaces and being coupled to an energy transformer in the housing to electrically charge the power storage device when operated.

Figure 1:
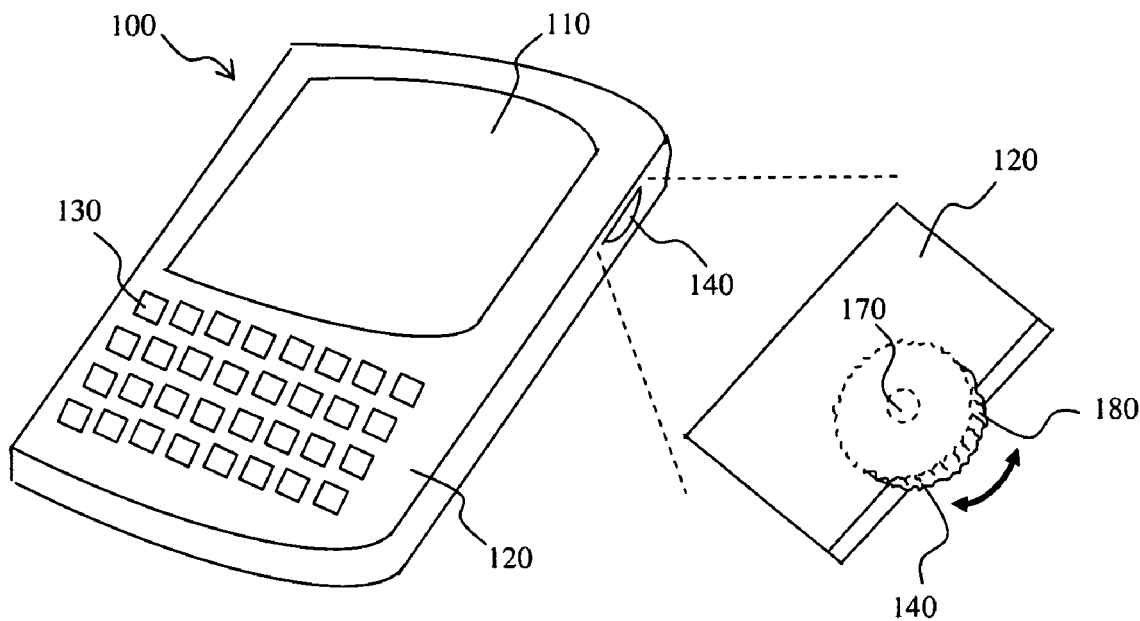
FIG. 1 is a perspective view of a mobile computing device having a wheel-type controller according to an embodiment of the invention.

FIG. 1 is a perspective view of a mobile computing device having a wheel-type controller according to an embodiment of the invention. Mobile computing device 100 can be any battery-powered mobile electronic device, such as a personal digital assistant (PDA), a mobile internet device (MID), a mobile phone, a smart phone and a portable gaming device. Mobile computing device 100 includes housing 120, display 110, keyboard 130, input controller 140, energy transformer (not shown), and electrical power storage device (not shown). Housing 120 provides an enclosure within which electronic components, such as an electrical power storage device, display screen 110, keyboard 130, and input controller 140 can be assembled, electrically connected, secured together, and physically protected from external forces. Electrical power storage device can be any type of known rechargeable battery.

Display 110 may be a liquid crystal display (LCD) or any other display device capable of projecting visual or graphical contents of a computing software. Display screen 110 may also be a touchscreen capable of detecting contact of a user's finger (or fingers) or hand or a passive object such as a stylus pen. Display screen 110 is adapted to display various user-interactive interfaces of computing software. The user-interactive interfaces may include graphical-user interface icons or any visual widgets such as a menu bar, a scrolling bar, a pointer, and a cursor. A user may interact with the user-interactive interfaces, for example, by providing input via keyboard 130 to type texts on display screen 110 for e-mailing and word processor applications. A user may also interact with the user-interactive interfaces by navigating a pointer or a cursor appearing on display screen 110 to position the pointer or cursor at different locations on display screen 110 via controller 140. A user may also scroll pages of display contents, for example, during browsing a webpage using controller 140. In a gaming application, a user may navigate the movement of one or more visual objects in a graphical gaming environment.

Mobile computing device 100 includes input controller 140 as an input tool. Input controller 140 is a manually operable controller interactable with the user-interactive interfaces projected on display screen 110. Input controller 140 may be a controller commonly devised to control the volume or pointer of a web-browsing application. Input controller 140 can be operated by a user's hand or fingers. Input controller 140 may be located anywhere on mobile computing device 100 convenient for a user to operate. Input controller 140 is coupled to an energy transformer disposed in housing 120 to electrically charge power storage device. The right portion of FIG. 1 is an exploded perspective view of input controller 140 according to an embodiment of the invention. For an embodiment, input controller 140 is an axially rotatable scroll wheel 140 partially embedded in housing 120. A first portion of wheel 140 is enclosed within housing 120 while the remaining portion of wheel 140 protrudes beyond housing 120 so that the remaining portion is accessible to a user to manually operate wheel 140. Scroll wheel 140 includes pivot 170 attached to housing 120 such that scroll wheel 140 axially rotates when a portion of wheel 140 is slided. The annular portion of wheel 140 includes a plurality of teeth 180 to provide contact friction between wheel 140 and a user's finger when operated.

Figure 2:
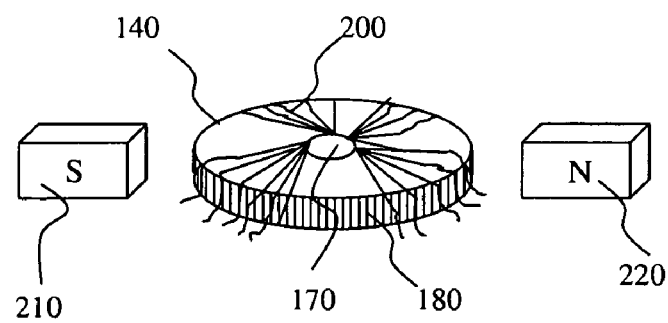
FIG. 2 is a perspective view of energy transformer of a mobile computing device according to an embodiment of the invention.

For an embodiment, energy transformer is an electromagnetic power generator. FIG. 2 is a perspective view of energy transformer of mobile computing device 100 according to an embodiment. Energy transformer includes conductor 200 disposed in an electromagnetic field. Conductor 200 may be a plurality of electrically conductive wires coiled around wheel 140. Conductive wires may be mounted inside wheel 140 or on the surface of wheel 140. Electromagnetic field is provided by at least a pair of stationary permanent magnets 150, 160 disposed on both ends of wheel 140 and within housing 120. Each respective end of magnets 150, 160 adjacent to wheel 140 has an opposite magnetic pole with respect to each other to create an electromagnetic field. When scrolling wheel 140 is manually operated, the mechanical rotation of wheel 140 displaces conductor within the electromagnetic field and electricity is generated. Electricity is generated when the kinetic energy of wheel 140 is converted to electrical energy. The generated electricity may be channeled to the battery of mobile computing device 100 for charging or storage.

Figure 3:
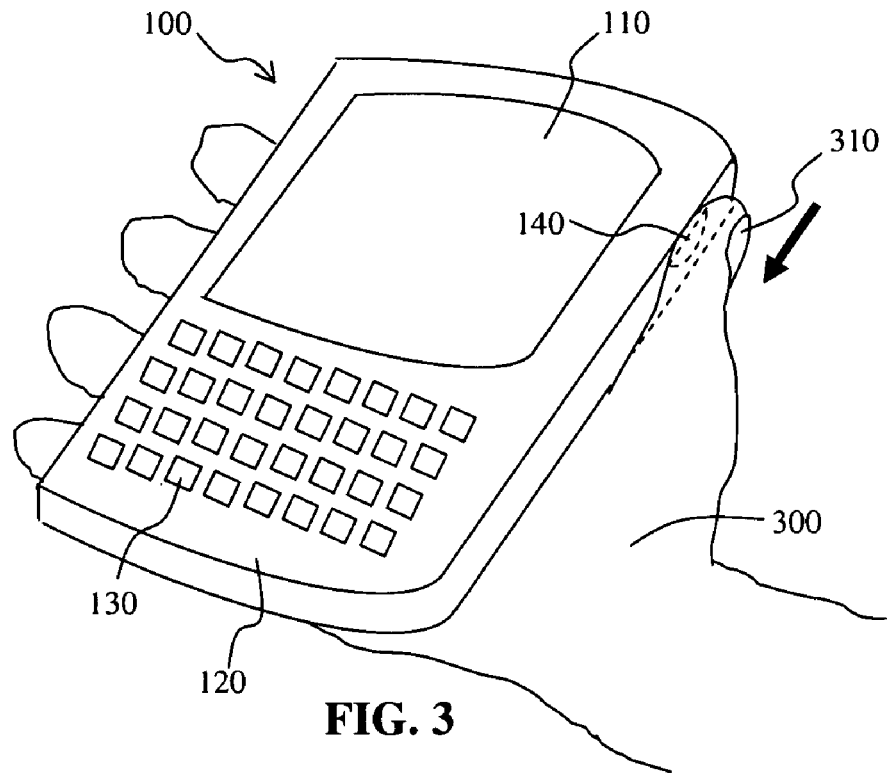
FIG. 3 is a perspective view of a mobile computing device having a wheel-type controller being operated with a user's thumb according to an embodiment of the invention.

Input controller 140 may be operated by a user's finger, for example, a user's thumb while mobile computing device 100 is being held or rested on a user's palm. Input controller 140 may also be operated by using a portion of a user's palm. FIG. 3 is perspective view of a mobile computing device having a wheel-type controller being operated with a user's thumb according to an embodiment of the invention. Mobile computing device 100 is rested on a user's palm 300. Controller 140 is being pressed against by a user's thumb 310. A user manually operates controller 140 by scrolling controller 140. Embodiments of the invention provide that controller 140 is coupled to energy transformer. The rotary kinetic motion of controller 140 when manually operated is converted to electrical energy.

Figure 4:
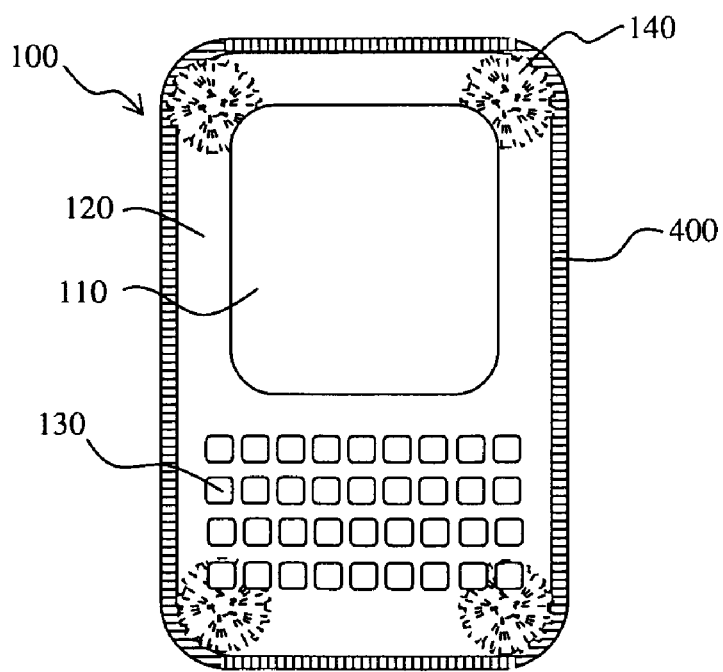
FIG. 4 is a top view of a mobile computing device according to another embodiment of the invention.
Figure 5:
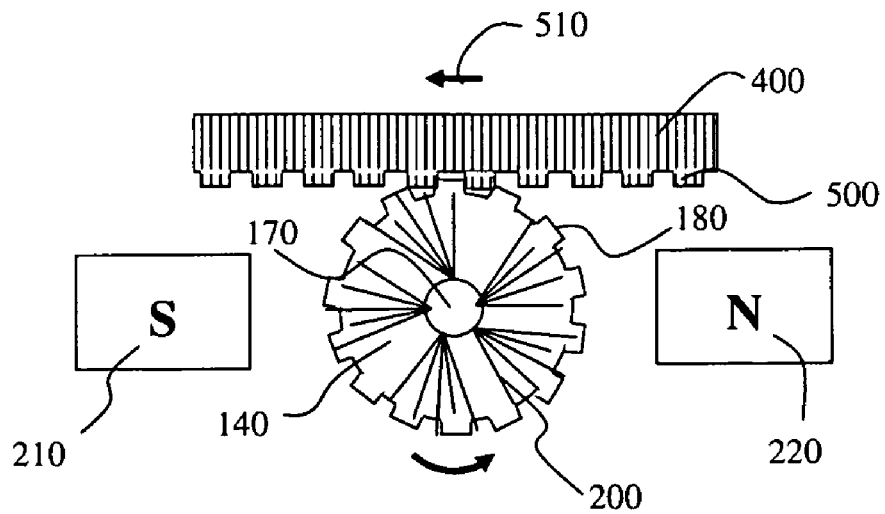
FIG. 5 is a side view of a belt coupled to energy transformer of a mobile computing device according to an embodiment of the invention.
Figure 6:
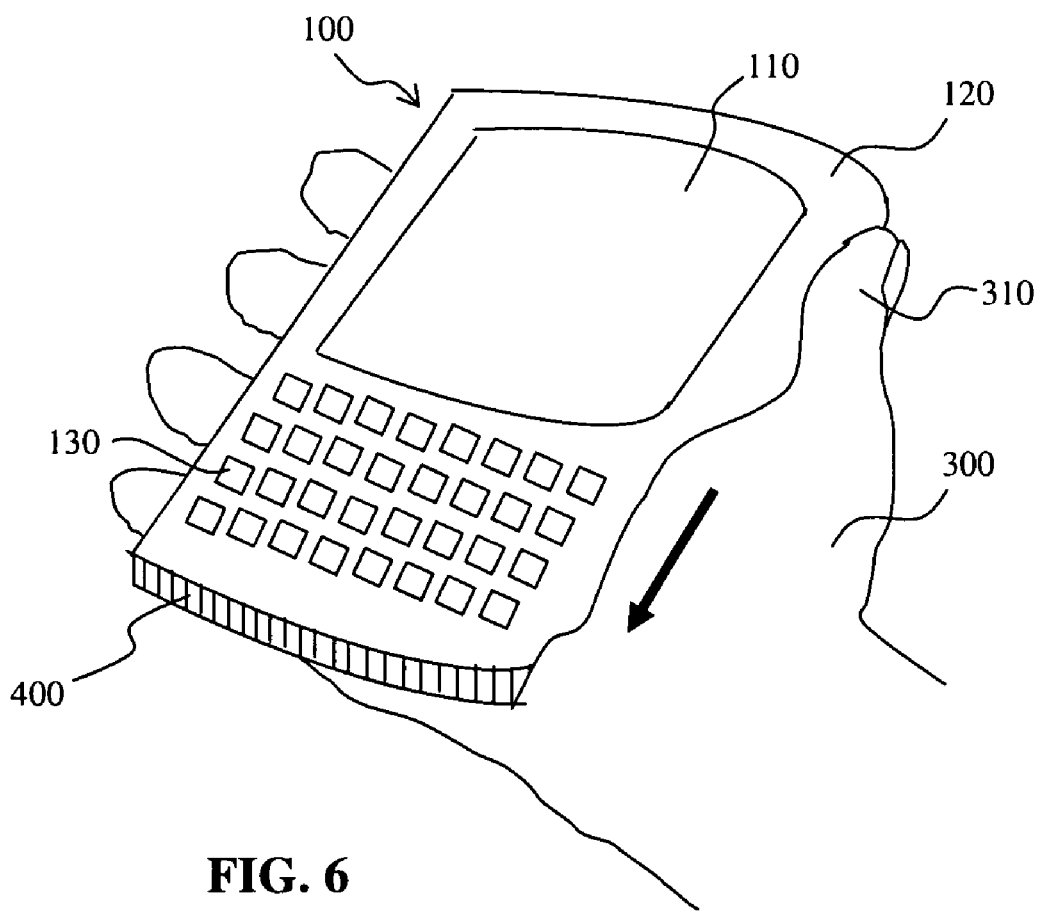
FIG. 6 is a perspective view of an embodiment of mobile computing device having a belt connected to a plurality of scroll wheels and being held in a user's palm.

FIG. 4 is a top view of a mobile computing device according to another embodiment of the invention. Mobile computing device 100 includes a plurality of scroll wheels 140 disposed within housing 120. Scroll wheels 140 may be disposed at the edges of mobile computing device 100. Belt 400 is disposed along the edges of mobile computing device 100 and is coupled to a plurality of scroll wheels 140. When belt 400 is laterally displaced, belt 400 in turn rotates scroll wheels 140. Belt 400 may be made of any durable material such as rubber. FIG. 5 is a side view of a belt coupled to energy transformer according to an embodiment. Each of a plurality of scroll wheels 140 includes conductors 200 coiled around the surface of scroll wheels 140 or disposed within scroll wheels 140. Each of a plurality of scroll wheels 140 is disposed between a pair of stationary permanent magnets 210, 220. Each magnet of magnets 210, 220 has an opposite magnetic pole adjacent to scroll wheel 140 to generate an electromagnetic field. Each scroll wheel 140 also includes a plurality of teeth 180 for coupling with belt 400. Belt 400 includes a plurality of teeth 500 adapted to mesh with teeth 180 of scroll wheels 140 such that when belt 400 is laterally displaced (for example in a direction as indicated by arrow 510), scroll wheels 140 are axially rotated. The rotation of scroll wheels 140 in turn rotates conductor 200 coiled around scroll wheels 140. The movement of conductor 200 in the electromagnetic field created by magnets 210, 220 generates electricity. FIG. 6 is a perspective view of an embodiment of mobile computing device 100 having a belt connected to a plurality of scroll wheels and being held in a user's palm 300. Scroll wheels 140 may be rotated by sliding a portion of a user's palm 300 against belt 400 and cause electricity to be generated. A user may also a larger portion of the hand, for example, by using both hands to slide belt 400. By using both hands to slide belt 400, a user essentially applies more kinetic energy to energy transformer of mobile computing device 100 and thus generates more electricity.

The amount of energy capable to be generated by energy transformer is a function of the amount work performed by a user. The amount of work performed by a user is a function of the rotational speed of scroll wheel 140 and the rigidity of scroll wheel 140. Scroll wheel 140 can be designed to exert a higher level of resistance for a user to rotate to generate a higher amount of energy per rotation. Conversely, scroll wheel 140 can also be designed to be less rigid to generate a lower amount of energy per rotation. Hence, scroll wheel 140 can be designed to have an adaptive rigidness suited for different scenarios or computing software. The rigidity of scroll wheel 140 can be designed to be adaptive to the user-interactive interfaces displayed on display screen 110. For example, in an Internet browser application, scroll wheel 140 may be configured to be less rigid so that a user may rotate scroll wheel 140 easily. Similarly, in a flaming application where responsive and speedy navigation of visual objects appearing on display screen 110 is required, scroll wheel 140 may be configured to be less rigid. When the power storage of the battery of mobile computing device 100 at low level and requires emergency charging, scroll wheel 140 may be configured to be more rigid so that a higher level of energy per rotation of scroll wheel 140 can be generated. For an embodiment, the configuration of the rigidity of scroll wheel 140 may be automatic, for example, depending on the type of the software application mobile computing device 100 is running. For another embodiment, the rigidity of scroll wheel 140 may be manually configured by a user, for example, by way of a mechanical button. Various methods are known to control the rigidity of scroll wheel 140. For example, the number of active wires coiled around scroll wheel 140 may be controlled to reach the optimal rigidity of scroll wheel 140.

Figure 7:
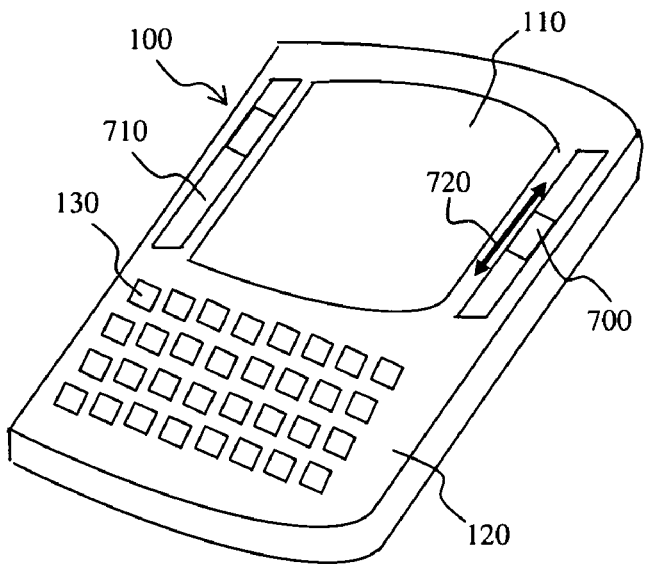
FIG. 7 is a perspective view of a mobile computing device having an input controller according to another embodiment of the invention.

Input controller 140 may take different forms in various embodiments. For an embodiment, input controller 140 is a sliding plate coupled to a scroll wheel. FIG. 7 is a perspective view of a mobile computing device having an input controller according to another embodiment. Input controller 140, according to an embodiment, is sliding plate 700 disposed on a surface of mobile computing device 100. One or more sliding plates 700 may be disposed adjacent to display screen 110 or at any other locations conveniently accessible to a user's hand or fingers. Sliding plate 700 is disposed within plate guide 710 such that sliding plate 710 can be bidirectionally displaced (as indicated by arrow 720 in FIG. 7).

Figure 8:
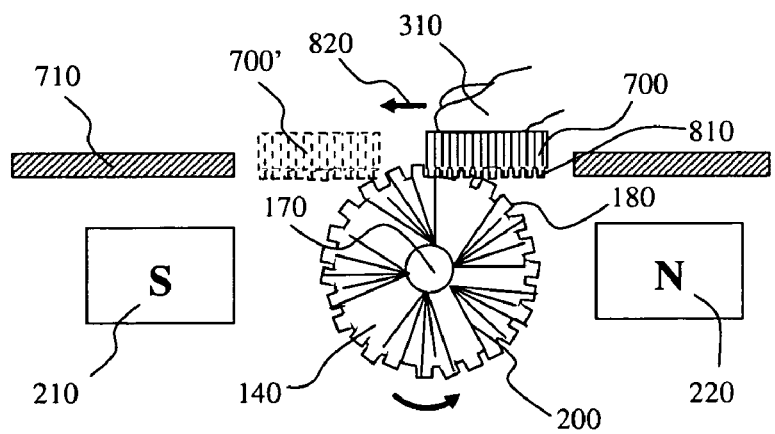
FIG. 8 is a side view of an input controller coupled to an energy transformer according to an embodiment of the invention.

Sliding plate 700 is coupled to energy transformer to convert the kinetic motion of sliding plate to electricity. FIG. 8 is a side view of an input controller coupled to an energy transformer according to an embodiment of the invention. Sliding plate 700 is coupled to scroll wheel 140 located beneath a side of sliding plate 700. Sliding plate includes a plurality of teeth 810 adapted to mesh with a plurality of 180 of scroll wheel 140. Scroll wheel 140 includes conductor 200 disposed on scroll wheel 140. Conductor 200, for an embodiment, includes a plurality of conductive wires coiled around scroll wheel 140. Scroll wheel 140 is disposed between a pair of stationary permanent magnets 210, 220. Magnets 210, 220 create an electromagnetic field. When finger 310 of a user slides sliding plate 700 in direction 820 to new position 700', scroll wheel 140 is in turn rotated. The rotation of scroll wheel causes conductor 200 to be displaced in an electromagnetic field and generates electricity.

Figure 9:
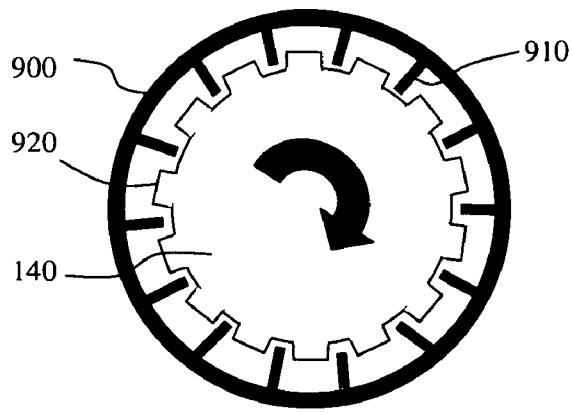
FIG. 9 is a side view of a piezoelectric generator of a mobile computing device according to an embodiment of the invention.

Besides an electromagnetic generator, other embodiments of energy generation for mobile computing device 100 include using piezoelectric generator technology. For an embodiment, a piezoelectric-based energy transformer may replace electromagnetic generator-based scroll wheel 140 shown in FIGS. 3, 4, and 7. FIG. 9 is a side view of a piezoelectric generator of a mobile computing device according to an embodiment. Mobile computing device 100 includes scroll wheel 140 having a plurality of protruding members 920. Scroll wheel 140 is coupled to generator frame 900. Generator frame 900 includes a plurality of piezoelectric members 910. Piezoelectric members 910 may be made of any piezoelectric materials known in the art capable of generating electricity when mechanical stress is applied thereto. For an embodiment, piezoelectric members 910 are made of MEMS cantilevers. Piezoelectric members 910 are configured such that when scroll wheel 140 is rotated, protruding members 920 will sweep against and vibrate piezoelectric members 910. When piezoelectric members 910 are vibrated, electricity will be generated.

Embodiments of the invention provide a mobile computing device capable of harvesting kinetic energy of a user. The generated electricity can be used to recharge the battery and prolong the battery life of the device. Embodiments also provide different configurations and forms of input controllers and energy transformers.

In the foregoing specification, reference has been made to specific embodiments of the invention. It will, however be evident that various modifications and changes may be made thereto without departing from the broader spirit and scope of the invention. The specification and drawings are, accordingly, to be regarded in an illustrative rather than restrictive sense.

What is claimed is:

1. A mobile computing apparatus, comprising:
an electrical power storage device disposed in a housing to power the apparatus;
a display screen attached to the housing to display a plurality of user-interactive interfaces; and
a manually operable input controller interactable with the interfaces and being coupled to an energy transformer in the housing to electrically charge the power storage device when operated, wherein the manually operable input controller includes a belt that is disposed along edges of the apparatus, the belt including an interior side having a plurality of teeth;
wherein the input controller includes a plurality of axially rotatable wheels disposed within the housing, each wheel of the wheels including a plurality of teeth to mesh with the plurality of teeth of the belt, each wheel of the plurality of wheels to be rotated when the belt is laterally displaced, each wheel of the plurality of wheels being operable to generate electricity;
wherein the energy transformer converts kinetic energy of the controller when operated to electrical energy to be channeled to the power storage device, the kinetic energy including movement of the belt in operation driving each wheel of the plurality of wheels.

2. The apparatus of claim 1, wherein each wheel of the plurality of wheels is disposed at one of a plurality of corners of the apparatus.

3. The apparatus of claim 1, wherein a rigidity of each wheel of the plurality of wheels is adaptable to increase when a charge of the electric power storage device is at a low level.

4. The apparatus of claim 1, wherein a rigidity of each wheel of the wheels is adaptive to the user-interactive interfaces.

5. The apparatus of claim 1, wherein the energy transformer includes at least a pair of stationary magnets for each wheel of the wheels, and wherein a conductor for each wheel of the plurality of wheels is disposed in an electromagnetic field provided by opposing poles of the stationary magnets for the wheel.

6. The apparatus of claim 5, wherein each wheel of the plurality of wheels includes a plurality of conductive wires coiled around the wheel.

7. The apparatus of claim 1, wherein the energy transformer includes a plurality of piezoelectric members for each wheel of the plurality of wheels, the plurality of piezoelectric members for a wheel being configured to be vibrated by a plurality of protruding members fixably connected to the wheel when the wheel is being axially rotated.

8. The apparatus of claim 7, wherein the piezoelectric members for each wheel of the plurality of wheels include microelectromechanical systems (MEMS)-type cantilevers.

9. The apparatus of claim 1, wherein the user-interactive interfaces each includes a graphical object of a graphical user interface controllable by the controller.

10. An energy harvesting system in a mobile device, comprising:
a rechargeable battery disposed in a housing of the device;
at least one manually accessible interface controller using a user's kinetic motion to interact with the device, the controller includes a plurality of axially rotatable wheels, each wheel of the plurality of wheels having a plurality of teeth, and includes a belt disposed along edges of the mobile device, the belt including an interior side having a plurality of teeth to mesh with the teeth of each wheel of the plurality of wheels, lateral movement of the belt operating to drive rotation of the plurality of wheels; and
an energy transformer coupled to the controller capable of translating the kinetic motion to electrical energy being stored in the battery, the energy transformer providing for converting kinetic energy of the plurality of wheels into electricity to charge the rechargeable battery.

11. The system of claim 10, wherein the energy transformer includes conductive wires disposed on each wheel of the plurality of wheels, and is disposed between at least a first and a second stationary magnet, each magnet having a first end directly adjacent to the respective wheel, the first end of the first magnet having a magnetic pole opposite to the first end of the second magnet.

12. The system of claim 10, wherein the energy transformer includes a plurality of piezoelectric members configured to be vibrated by a plurality of protruding members extending from each wheel of the plurality of wheels when the wheel is being axially rotated.

13. The system of claim 10, wherein the piezoelectric members for each wheel of the plurality of wheels include microelectromechanical systems (MEMS)-type cantilevers.

14. The system of claim 10, wherein a rigidity of each wheel of the plurality of wheels when rotated is adaptive to a plurality of user-interactive interfaces of an application executed by the mobile device.

15. The system of claim 10, wherein a rigidity of each wheel of the plurality of wheels is adaptable to increase when a charge of the rechargeable battery is at a low level.

16. An energy harvesting system in a mobile device, comprising:
a rechargeable battery disposed in a housing of the device;
a display screen attached to the housing to display a plurality of user-interactive interfaces of an application executed by the device;

a plurality of axially rotatable wheels coupled to the housing, each wheel of the plurality of wheels being manually rotatable by a user's manual kinetic motion to interact with the interfaces, each wheel of the plurality of wheels including a plurality of teeth;

a belt disposed along edges of the mobile device, the belt including an interior side having a plurality of teeth to mesh with the teeth of each of the plurality of wheels to drive rotation of the plurality of wheels when the belt is laterally displaced; and an energy transformer aligned to each wheel of the plurality of wheels to convert the kinetic motion of the wheel when rotated to electrical energy charging and being stored in the battery.

17. The system of claim 16, wherein the energy transformer includes conductive wires coiled around each wheel of the plurality of wheels, each wheel being disposed between a respective first and a respective second stationary magnet, a first end of the magnets for each wheel being directly adjacent to the wheel and having opposing magnetic poles.

18. The system of claim 16, wherein the energy transformer includes a plurality of piezoelectric cantilevers configured to be vibrated by a plurality of protruding members extending from each wheel of the plurality of wheels when the wheel is being axially rotated.

19. The system of claim 16, wherein a rigidity of each wheel of the plurality of wheels is adaptable to increase when a charge of the rechargeable battery is at a low level.

* * * * *

UNITED STATES PATENT AND TRADEMARK OFFICE
CERTIFICATE OF CORRECTION

| | | |
|---|---|---|
| PATENT NO. | : 8,134,341 B2 | Page 1 of 1 |
| APPLICATION NO. | : 12/435378 | |
| DATED | : March 13, 2012 | |
| INVENTOR(S) | : Naeimi et al. | |

It is certified that error appears in the above-identified patent and that said Letters Patent is hereby corrected as shown below:

In the Specification

In column 4, at line 27 delete, "flaming" and insert -- gaming --.

Signed and Sealed this
Eighteenth Day of November, 2014

Michelle K. Lee
*Deputy Director of the United States Patent and Trademark Office*